US010205319B2

(12) United States Patent
Pereira et al.

(10) Patent No.: US 10,205,319 B2
(45) Date of Patent: Feb. 12, 2019

(54) AUTOMATIC MATCHING OF SOURCES TO LOADS

(75) Inventors: Luis R. Pereira, Menomonee Falls, WI (US); Dominique L. Lallement, Grenoble (FR)

(73) Assignee: Eaton Intelligent Power Limited, Dublin (IE)

( * ) Notice: Subject to any disclaimer, the term of this patent is extended or adjusted under 35 U.S.C. 154(b) by 701 days.

(21) Appl. No.: 12/814,087

(22) Filed: Jun. 11, 2010

(65) Prior Publication Data

US 2011/0307115 A1    Dec. 15, 2011

(51) Int. Cl.
*H02J 3/14* (2006.01)
*G06Q 10/04* (2012.01)
*G06Q 50/06* (2012.01)
*H02J 3/00* (2006.01)

(52) U.S. Cl.
CPC .............. *H02J 3/14* (2013.01); *G06F 1/3209* (2013.01); *G06Q 10/04* (2013.01); *G06Q 50/06* (2013.01); *H02J 2003/007* (2013.01); *Y02B 70/3225* (2013.01); *Y02E 60/76* (2013.01); *Y04S 20/222* (2013.01); *Y04S 40/22* (2013.01)

(58) Field of Classification Search
USPC ......................................................... 706/12
See application file for complete search history.

(56) References Cited

U.S. PATENT DOCUMENTS

| 7,313,465 | B1 | 12/2007 | O'Donnell |
| 7,418,608 | B2 | 8/2008 | Kumar et al. |
| 7,504,940 | B2* | 3/2009 | Luebke ............... G08B 25/009 340/12.23 |
| 7,551,456 | B2 | 6/2009 | Behrens et al. |

(Continued)

FOREIGN PATENT DOCUMENTS

| CN | 101162843 | 10/2006 |
| EP | 2095203 | 9/2009 |

(Continued)

OTHER PUBLICATIONS

Valle, Venayagamoorthy, Mohagheghi, Hernandez, Harley, "Particle Swarm Optimization: Basic Concepts, Variants and Applications in Power Systems", IEEE Transactions on Evolutionary Computation, vol. 12, No. 2, Apr. 2008, pp. 171-195.*

(Continued)

*Primary Examiner* — Michael B Holmes
(74) *Attorney, Agent, or Firm* — Benesch Friedlander Coplan & Aronoff LLP

(57) ABSTRACT

A method of matching sources to loads includes affecting load activity at a load with a pattern, receiving source activity data representing source activity at a plurality of sources, and matching the load to at least one source based on the source activity data. A system for matching sources to loads includes a load activity manipulator operably connected to a load and configured to affect load activity of the load with a pattern. The system for matching sources to loads further includes an activity monitor configured to (Continued)

receive source activity data representing source activity at the sources. The system for matching sources to loads also includes a matching engine operably connected to the activity monitor and configured to match the load to at least one source based on the source activity data.

14 Claims, 12 Drawing Sheets

(56) References Cited

U.S. PATENT DOCUMENTS

| | | | |
|---|---|---|---|
| 7,574,491 B2 | 8/2009 | Stein et al. | |
| 7,600,010 B2* | 10/2009 | Das | H04L 69/32 709/217 |
| 7,633,882 B2* | 12/2009 | Das | H04L 45/42 370/252 |
| 7,697,495 B2* | 4/2010 | Armstrong | H04W 24/08 370/241 |
| 7,801,077 B2* | 9/2010 | Rentel | H04W 72/082 370/329 |
| 7,830,834 B2* | 11/2010 | Das | H04W 48/08 370/256 |
| 7,830,918 B2* | 11/2010 | Das | H04L 49/90 370/465 |
| 7,911,338 B2* | 3/2011 | Naeve | H04W 8/005 340/5.8 |
| 7,912,164 B2* | 3/2011 | Armstrong | H04J 3/0658 375/354 |
| 7,953,327 B2* | 5/2011 | Pereira | G01S 5/0284 398/116 |
| 8,515,687 B2* | 8/2013 | Pereira | F16L 11/127 702/179 |
| 8,805,998 B2* | 8/2014 | Pereira | G06F 1/32 382/162 |
| 9,677,967 B2* | 6/2017 | Pereira | F16L 11/086 |
| 2001/0039581 A1* | 11/2001 | Deng et al. | 709/226 |
| 2004/0257858 A1 | 12/2004 | Mansingh | |
| 2005/0071092 A1 | 3/2005 | Farkas et al. | |
| 2006/0276938 A1 | 12/2006 | Miller | |
| 2008/0141048 A1 | 6/2008 | Palmer et al. | |
| 2008/0184044 A1 | 7/2008 | Leech et al. | |
| 2008/0317021 A1 | 12/2008 | Ives et al. | |
| 2009/0019201 A1 | 1/2009 | Chainer et al. | |
| 2009/0024764 A1 | 1/2009 | Atherton et al. | |
| 2009/0077398 A1 | 3/2009 | Bland et al. | |
| 2009/0200867 A1 | 8/2009 | Katz | |
| 2009/0235097 A1 | 9/2009 | Hamilton et al. | |
| 2009/0240964 A1 | 9/2009 | Pfeiffer | |
| 2009/0254660 A1 | 10/2009 | Hanson et al. | |
| 2009/0273334 A1 | 11/2009 | Holovacs et al. | |
| 2009/0282140 A1 | 11/2009 | White et al. | |
| 2009/0282274 A1 | 11/2009 | Langgood et al. | |
| 2009/0307515 A1 | 12/2009 | Bandholz et al. | |
| 2010/0005331 A1 | 1/2010 | Somasundaram et al. | |
| 2010/0214873 A1 | 8/2010 | Somasundaram et al. | |

FOREIGN PATENT DOCUMENTS

| | | |
|---|---|---|
| GB | 2145809 | 1/2006 |
| JP | 04015990 | 1/2004 |
| JP | 04438817 | 3/2010 |
| WO | 2009123586 | 10/2009 |
| WO | 2009134222 | 11/2009 |
| WO | 2010005429 | 1/2010 |
| WO | 2010048316 | 4/2010 |
| WO | 2010093515 | 8/2010 |
| WO | 2010093549 | 8/2010 |

OTHER PUBLICATIONS

B. Zhao, C. X. Guo, Y. J. Cao, "Improved Particle Swarm Optimization Algorithm for OPF Problems", Power Systems Conference and Exposition, 2004. IEEE PES, Oct. 10, 2004, pp. 233-238.*

Royal Society Open Science Prediction limits of mobile phone activity modelling Dániel Kondor, Sebastian Grauwin, Zsófia Kallus, István Gódor, Stanislav Sobolevsky, Carlo Ratti Published Feb. 15, 2017. DOI: 10.1098/rsos.160900 pp. 1-14.*

IEEE Modeling Temporal Interactions with Interval Temporal Bayesian Networks for Complex Activity Recognition, Yongmian Zhang; Yifan Zhang; Eran Swears; Natalia Larios; Ziheng Wang; Qiang Ji IEEE Transactions on Pattern Analysis and Machine Intelligence ( vol. 35, Issue: 10, Oct. 2013) pp. 2468-2483.*

IEEE a Benchmark Characterization of the EEMBC Benchmark Suite Jason A. Poovey; Thomas M. Conte; Markus Levy; Shay Gal-On IEEE Micro ( vol. 29, Issue: 5, Sep.-Oct. 2009) pp. 18-29 IEEE.*

Exact Indexing of Dynamic Time Warping, Keogh and Ratanamahatana, Knowledge and Information Systems (2004), Springer-Verlag London Ltd., DOI 10.1007/s10115-004-0154-9.

Increasing Data Center Efficiency with Server Power Measurements, IT@Intel White Paper, Intel Information Technology, Data Center Efficiency, Jan. 2010.

Kansel et al., "Virtual Machine Power Metering and Provisioning", AMC Symposium on Cloud Computing (SOCC '10), Jun. 10-11, 2010, Indianapolis, IN USA.

Communication pursuant to Article 94(3) EPC for EP11754474.2 dated Feb. 16, 2015.

* cited by examiner

AUTOMATIC MATCHING OF SOURCES TO LOADS

BACKGROUND

This disclosure relates to applications involving the use of sources and loads. In particular, the disclosure relates to automatic matching of sources to loads.

As systems grow in complexity with increasing numbers of loads and sources, keeping track of which loads feed from which sources becomes more difficult. Also, as the practice of remotely monitoring systems increases, keeping track of the physical location of loads becomes more difficult. Moreover, loads and sources may be continuously added, removed, temporarily disconnected, relocated, and reconnected. Thus, the locations of loads and the topology of the connections between loads and sources is a live, dynamic environment.

One example where topology information is useful is in data center applications. As the costs of energy and, in particular, electricity increases, having up-to-date information regarding power topologies and specifically the physical location of the servers and which servers connect to which circuit branches or power points becomes increasingly important.

This information enables data center managers to optimize power consumption via adequate planning, right-sizing of energy supply to data center equipment, power balancing, load shedding, overload protection, efficient problem diagnosis, and so on. Additionally, in some data center applications, managers may be required to maintain up-to-date power topology information in order to monitor reliability and reduce troubleshooting time in case of failure.

Various applications other than data center applications exist where topology and load location information is or would be useful.

Known methods for maintaining topology and location information include spreadsheets or databases that are updated from time to time to reflect connections between loads and sources. Other methods include tagging of loads or feed cables with bar codes or RFID tags that are scanned from time to time. Some of these methods have proven unreliable at times and do not provide up-to-date information at all times. In addition, some of these methods require human intervention, which adds to the cost of maintenance as well as to the potential unreliability.

SUMMARY

In one embodiment, a method of matching sources to loads includes receiving load activity data representing load activity over a time period. The method of matching sources to loads further includes receiving source activity data representing source activity over the time period. The source activity data includes data reflecting aggregated load activity corresponding to multiple loads operably connected to one source. Finally, the method of matching sources to loads includes matching at least two loads from the multiple loads to the source based on the load activity data and the source activity data.

In another embodiment, a method of matching sources to loads includes affecting load activity at a load with a pattern, receiving source activity data representing source activity at a plurality of sources, and matching the load to at least one source based on the source activity data.

In one embodiment, a system for matching sources to loads includes a load activity manipulator operably connected to a load and configured to affect load activity of the load with a pattern. The system for matching sources to loads further includes an activity monitor configured to receive source activity data representing source activity at the sources. The system for matching sources to loads also includes a matching engine operably connected to the activity monitor and configured to match the load to at least one source based on the source activity data.

BRIEF DESCRIPTION OF THE DRAWINGS

The accompanying drawings, which are incorporated in and constitute a part of the specification, illustrate various exemplary systems, methods, and so on, that illustrate various example embodiments of aspects of the invention. It will be appreciated that the illustrated boundaries of components in the figures represent one example of the boundaries. One of ordinary skill in the art will appreciate that one component may be designed as multiple components or that multiple components may be designed as a single component. Additionally, an internal component may be implemented as an external component and vice versa. Further, the figures may be drawn not to scale and the proportions of certain parts may be exaggerated for convenience of illustration.

DETAILED DESCRIPTION

Definitions

Figure 1:
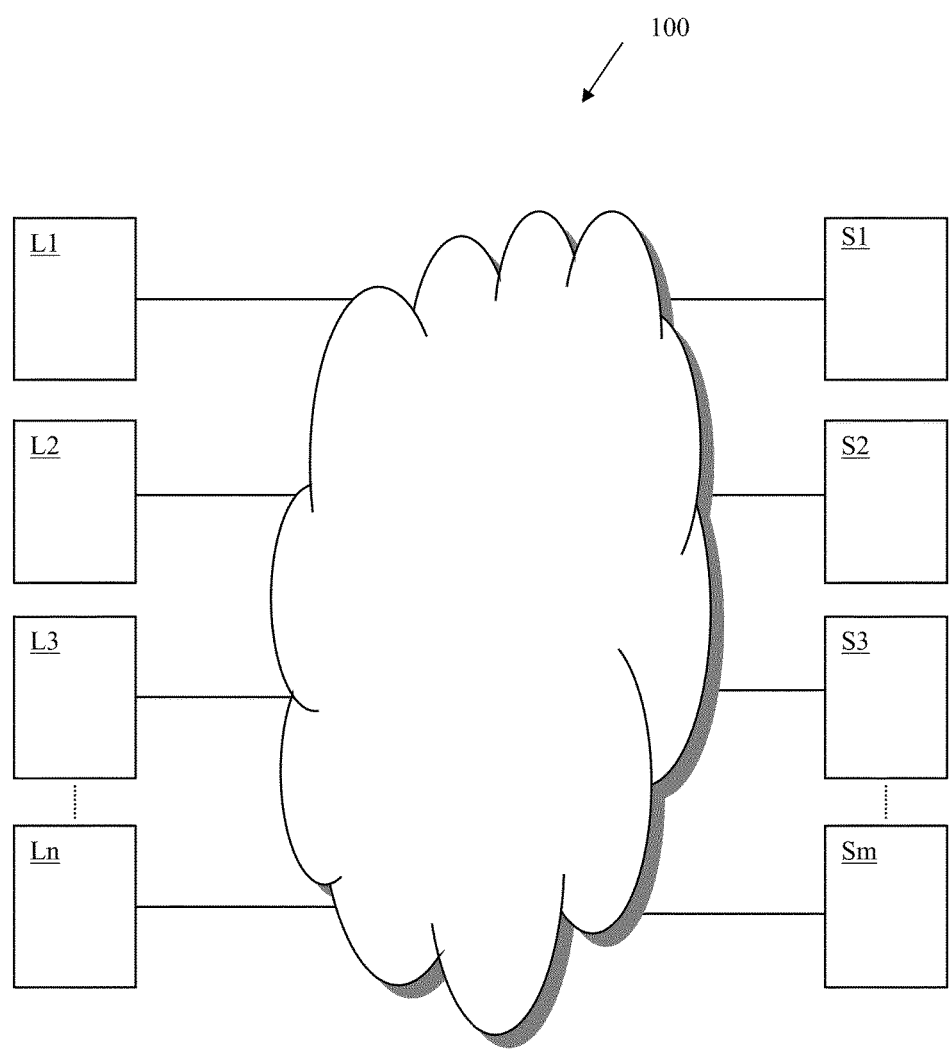
FIG. 1 illustrates a diagram of an exemplary system including loads and sources.

"Computer-readable medium," as used herein, refers to a medium that participates in directly or indirectly providing signals, instructions or data. A computer-readable medium may take forms, including, but not limited to, non-volatile media, volatile media, and transmission media. Non-volatile media may include, for example, optical or magnetic disks, and so on. Volatile media may include, for example, optical or magnetic disks, dynamic memory and the like. Transmission media may include coaxial cables, copper wire, fiber optic cables, and the like. Transmission media can also take the form of electromagnetic radiation, like that generated during radio-wave and infra-red data communications, or take the form of one or more groups of signals. Common forms of a computer-readable medium include, but are not limited to, a floppy disk, a flexible disk, a hard disk, a magnetic tape, other magnetic media, a CD-ROM, other optical media, punch cards, paper tape, other physical media with patterns of holes, a RAM, a ROM, an EPROM, a FLASH-EPROM, or other memory chip or card, a memory stick, a carrier wave/pulse, and other media from which a computer, a processor or other electronic device can read. Signals used to propagate instructions or other software over a network, like the Internet, can be considered a "computer-readable medium."

"Data store," as used herein, refers to a physical or logical entity that can store data. A data store may be, for example, a database, a table, a file, a list, a queue, a heap, a memory, a register, and so on. A data store may reside in one logical or physical entity or may be distributed between two or more logical or physical entities.

"Logic," as used herein, includes but is not limited to hardware, firmware, software or combinations of each to perform a function(s) or an action(s), or to cause a function or action from another logic, method, or system. For example, based on a desired application or needs, logic may include a software controlled microprocessor, discrete logic like an application specific integrated circuit (ASIC), a programmed logic device, a memory device containing instructions, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics. It will also be appreciated that computer-readable or executable instructions can be located in one logic or distributed between two or more communicating, co-operating, or parallel processing logics and thus can be loaded or executed in serial, parallel, massively parallel and other manners.

An "operable connection," or a connection by which entities are "operably connected," is one in which signals, physical communications, or logical communications may be sent or received. Typically, an operable connection includes a physical interface, an electrical interface, or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical or physical communication channels can be used to create an operable connection. An "operable connection," or a connection by which components are "operably connected," is also one by which the operably connected components or the operable connection perform its intended purpose. For example, two components may be operably connected to each other directly or through one or more intermediate components.

"Signal," as used herein, includes but is not limited to one or more electrical or optical signals, analog or digital signals, data, one or more computer or processor instructions, messages, a bit or bit stream, or other means that can be received, transmitted or detected.

"Software," as used herein, includes but is not limited to, one or more computer or processor instructions that can be read, interpreted, compiled, or executed and that cause a computer, processor, or other electronic device to perform functions, actions or behave in a desired manner. The instructions may be embodied in various forms like routines, algorithms, modules, methods, threads, or programs including separate applications or code from dynamically or statically linked libraries. Software may also be implemented in a variety of executable or loadable forms including, but not limited to, a stand-alone program, a function call (local or remote), a servelet, an applet, instructions stored in a memory, part of an operating system or other types of executable instructions. It will be appreciated by one of ordinary skill in the art that the form of software may depend, for example, on requirements of a desired application, the environment in which it runs, or the desires of a designer/programmer or the like.

Suitable software for implementing the various components of the exemplary systems and methods described herein may be produced using programming languages and tools like Java, Java Script, Java.NET, ASP.NET, VB.NET, Cocoa, Pascal, C#, C++, C, CGI, Perl, SQL, Matlab, Mathematica, Maple, Mathcad, APIs, SDKs, assembly, firmware, microcode, or other languages and tools. Software, whether an entire system or a component of a system, may be embodied as an article of manufacture and maintained or provided as part of a computer-readable medium as defined previously. Another form of the software may include signals that transmit program code of the software to a recipient over a network or other communication medium. Thus, in one example, a computer-readable medium has a form of signals that represent the software/firmware as it is downloaded from a web server to a user. In another example, the computer-readable medium has a form of the software/firmware as it is maintained on the web server. Other forms may also be used.

"User," as used herein, includes but is not limited to one or more persons, software, computers or other devices, or combinations of these.

"Matching," as used herein in the context of matching loads to sources, includes but is not limited to, discovering or determining connectivity relationships (e.g. electrical connections, power connections, fluid connections, and so on) between loads and sources.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include manipulations of physical or non-physical quantities. Usually, though not necessarily, these quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, computing, calculating, determining, displaying, or the like, refer to actions and processes of a computer system, logic, processor, or similar electronic device that manipulates and transforms data represented as physical (electronic) quantities.

In the Figures

FIG. 1 illustrates a diagram of a system 100 including n loads L1-Ln and m sources S1-Sm. The loads L1-Ln are fed from the sources S1-Sm and therefore each load connects to at least one source. However, it is not clear which loads connect to which sources. As systems such as system 100 grow in complexity with increasing numbers of loads and sources, keeping track of which loads are connected to which sources and keeping track of the physical location of the loads becomes more difficult.

Figure 2:
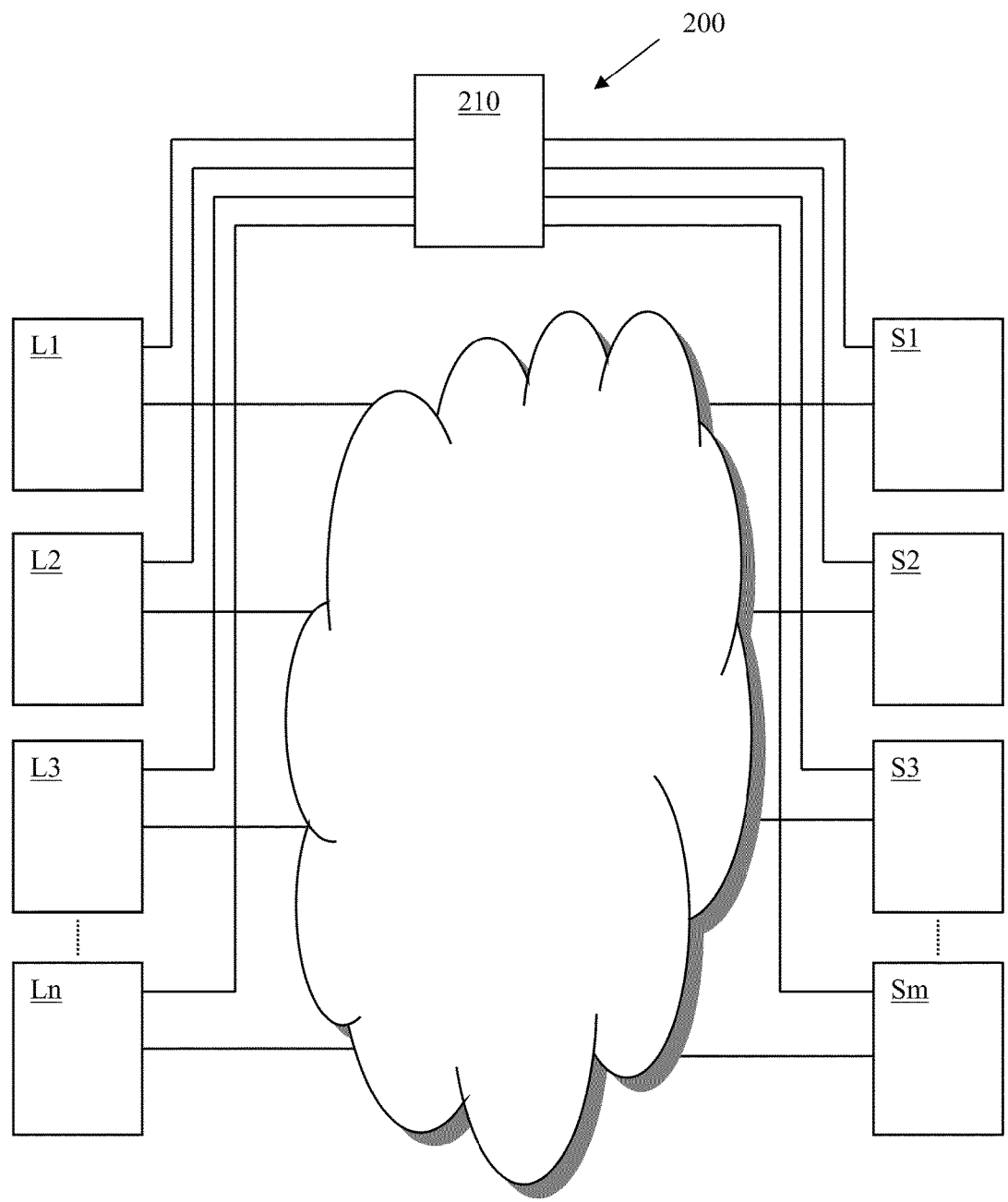
FIG. 2 illustrates a diagram of an exemplary system including loads, sources, and a matching server.

FIG. 2 illustrates a diagram of a system 200. Like the system 100 discussed above, the system 200 includes n loads L1-Ln and m sources S1-Sn. The loads L1-Ln feed from the sources S1-Sm and therefore each load connects to at least one source.

In the system 200, the loads L1-Ln are activity aware loads. This means that the loads L1-Ln are capable of reporting load activity data corresponding to their own activity levels over a time period. For example, in a data center, where the loads L1-Ln may be servers, the operating systems of the servers are capable of reporting server activity metrics or load activity data such as CPU utilization, I/O utilization, network utilization, and so on. Other examples of activity aware loads include telecom equipment, network hubs, HVAC equipment, motors and so on. Load activity data could include any physically measurable quantity. Other examples of load activity data include power, signal strength, heat dissipation, torque, pressure, flow, operations per unit time, and so on.

In the system 200, the sources S1-Sm are activity aware sources. Sources S1-Sm are capable of reporting source activity data corresponding to their own activity levels over a time period. In the data center example, the sources S1-Sm may be uninterruptible power supplies (UPS) or power distribution units (PDU). These sources are capable of reporting source activity directly associated with loads fed from the sources. For example, a PDU may be configured to report consumption in kVA for each output breaker to which an activity aware load connects. In another example, a UPS to which multiple activity aware loads operably connect may be configured to report consumption in VA. Other examples of activity aware sources include motor starters, pneumatic pumps, batteries, DC power supplies, and so on. Source activity data could include any physically measurable quantity. Other examples of source activity data include power, current, harmonic distortion, power factor, real power, apparent power, V+A, pressure, flow, and so on.

The system 200 further includes a matching server 210. The matching server 210 is operably connected to the loads L1-Ln and to the sources S1-Sm. The matching server 210 receives load activity data from the loads L1-Ln and source activity data from the sources S1-Sm. Based on the load activity data and the source activity data, and assuming that there is negligible energy storage at the loads, the matching server 210 can automatically match loads to sources and hence determine the topology of the system 200.

In one embodiment, the matching server 210 determines the topology of the system 200 including all loads and sources periodically at a preprogrammed time interval. In another embodiment, the matching server 210 probes the connection of previously matched load-source sets periodically. The matching server 210 may probe connections of matched load-source sets one set at a time or more than one set at a time. In other embodiments, the matching server 210 matches loads to sources or probes previously matched sets upon certain conditions (e.g. user action, load insertion, source insertion, load removal, source removal, source underload, and so on).

The person of ordinary skill in the art would understand that the matching server 210 can be a stand alone server or computer, or the matching server 210 can reside within a network management computer or other network computer, or the matching server 210 can be embedded within other equipment (e.g. PDU, meter-control-adjust (MCA) modules, blade racks, and so on) in the system.

Figure 3:
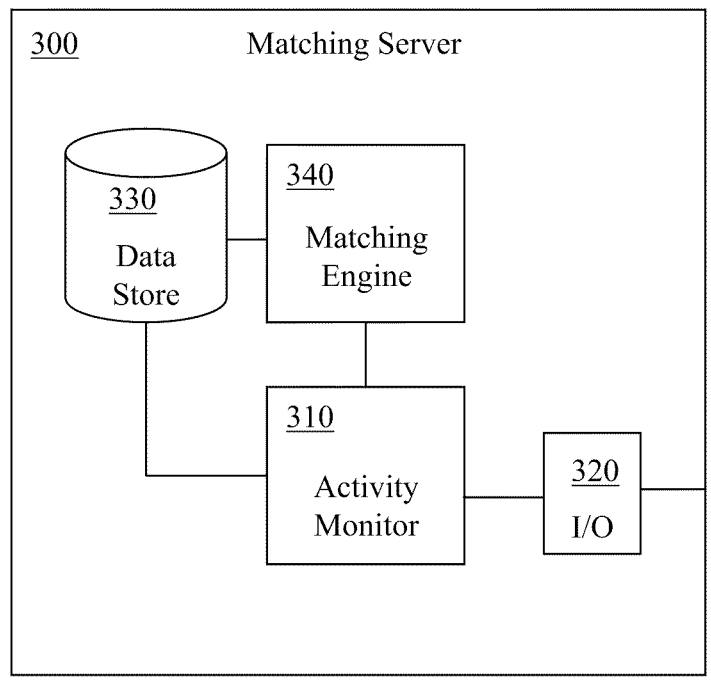
FIG. 3 illustrates a functional block diagram of one embodiment of a matching server for automatically matching loads to sources.

FIG. 3 illustrates a functional block diagram of an embodiment of a matching server 300 for automatically matching loads to sources as disclosed above in reference to FIG. 2.

The matching server 300 includes an activity monitor 310 configured to receive the load activity data and the source activity data. In the illustrated embodiment, the activity monitor 310 is operably connected to an I/O interface 320 configured to interact with a network including the loads and sources.

The matching server 300 further includes a data store 330 operably connected to the activity monitor 310 and the matching engine 340. The data store 330 stores the source activity data and the load activity data.

The matching server 300 also includes a matching engine 340 operably connected to the activity monitor 310 or the data store 330 and configured to automatically match sources to loads based on the source activity data and the load activity data.

The matching engine 340 works under the assumption that a functional relationship exists between the source activity data and the load activity data corresponding to sources and loads, respectively, which are connected to each other in the system. In the example of a data center, power consumption increases as server activity increases. Thus, for loads and sources that are connected, $A_S = f(A_L)$, where $A_S$ is the source activity data and $A_L$ is the load activity data. The function $f$ increases or decreases monotonically, but not necessarily linearly.

Since the function $f$ is monotonic, it is possible for the matching engine 340 to use a nonparametric correlation method (e.g. Friedman test, Kendall's tau, Siegel-Tukey test, Spearman's rho, Levenstein distance, and so on) to score how similar the source activity data corresponding to a source and the load activity data corresponding to a load are. If, for example, Spearman's rho is used, a correlation coefficient would be defined as:

$$s(A_L, A_S) = \rho = 1 - \frac{6 \sum_{i=1}^{n} d_i^2}{n(n^2 - 1)},$$

$d = \text{rank}_{A_L}(a_{Li}) - \text{rank}_{A_S}(a_{Si})$ where $\rho \in [0,1]$, $A_L = (a_{L1}, a_{L2}, \ldots, a_{Ln})$, $A_S = (a_{S1}, a_{S2}, \ldots, a_{Sn})$, $\text{rank}_{A_L}(a_{Li}) = |\{x_i \in A_L : x_i \leq a_{Li}\}|$, and $\text{rank}_{A_S}(a_{Si}) = |\{x_i \in A_S : x_i \leq a_{Si}\}|$. So, if the load activity data includes readings from m loads (i.e. $A_L^{(1)}, A_L^{(2)}, \ldots, A_L^{(m)}$) and the source activity data includes readings from m sources (i.e. $A_S^{(1)}, A_S^{(2)}, \ldots, A_S^{(m)}$), then the correlation $s(A_L^{(i)}, A_S^{(j)})$ could be used to perform automatic matching.

In one embodiment, the load activity data includes at least 20 readings or samples from m loads and the source activity data includes at least 20 readings or samples from m sources. In another embodiment, the load activity data includes 30 readings or samples from m loads and the source activity data includes 30 readings or samples from m sources. In other embodiments, the load activity data includes more than 20 readings or samples or less than 30 readings or samples from m loads and the source activity data includes more than 20 readings or samples or less than 30 readings or samples from m sources. In other embodiments, the activity monitor 310 may continuously receive the load activity data and the source activity data and the matching engine 340 may use the most recent incoming readings or samples in matching.

The matching engine 340 automatically matches loads to sources by solving a combinatorial optimization problem that deals with assigning the m loads to the m sources according to an optimization criteria such that the result is the "best possible" assignment. In one embodiment, the matching engine 340 automatically matches loads to sources by solving a linear summation assignment problem (LSAP). In other embodiments, the matching engine 340 automatically matches loads to sources by methods other than solving linear summation assignment problems such as solving quadratic assignment problems, linear block assignment problems, and so on.

In one embodiment, the quantification of "best possible" corresponds to a score of dissimilarity or association cost metric $\Delta(A_L^{(i)}, A_S^{(j)})$, which increases as $A_L^{(i)}$ and $A_S^{(j)}$ are less similar (i.e. $\Delta(A_L^{(i)}, A_S^{(j)})=-s(A_L^{(i)}, A_S^{(j)})$. In this example, the lower the score or cost the more similar the source activity data corresponding to a source and the load activity data corresponding to a load are. In this embodiment, the linear summation assignment problem becomes matching each load to one source in such a way that the total cost of the matching (i.e. the sum of the scores) is minimized.

In one embodiment, the matching engine 340 solves the linear summation assignment problem of automatic matching of loads to sources using Munkres' algorithm. Using Munkres', the linear summation assignment problem of automatic matching of loads to sources can be stated as finding the binary permutation matrix $X=(x_{ij})_{m\times m}$, with $x_{ij}=1$ if $A_S^{(j)}=f(A_L^{(i)})$ (e.g. load i is connected to source j) and $x_{ij}=0$ otherwise, that minimizes $\Sigma_{i=1}^m \Sigma_{j=1}^m \Delta(A_L^{(i)}, A_S^{(j)})x_{ij}$ subject to $\Sigma_{i=1}^m x_{ij}=1$ for $j=1, \ldots, m$, $\Sigma_{j=1}^m x_{ij}=1$ for $i=1, \ldots, m$, and $x_{ij}\in\{0,1\}$ for $i,j=1, \ldots, m$. Once X is found, a list of matching pairs P of loads L that are connected to sources S may be constructed as $P=\{(L_i, S_j):x_{ij}=1\}$.

In the above embodiment, the Munkres' algorithm is used to solve the linear summation assignment problem. In other embodiments, the matching engine 340 may use one of several algorithms other than Munkres' (e.g. Jonker-Volgenant, Burkard-Derigs, Dell'Amico, Martello, Yamada, and so on) to solve the linear summation assignment problem.

Use of correlation algorithms such as Spearman's rho as basis for the score of similarity or association cost metric $\Delta(A_L^{(i)}, A_S^{(j)})$ may be hindered by practical implementation challenges. For example, the reporting rates for the load activity data and for the source activity data cannot be assumed to be the same since they do not necessarily come from the same data streams. Different reporting rates for the load activity data and for the source activity data may cause shifted or stretched time series resulting in delayed or missing data that would affect time alignment necessary to accurately compare corresponding samples in the load activity data and the source activity data.

In one embodiment, the matching engine 340 uses dynamic time warping (DTW) to overcome the problem of comparing shifted or stretched time series of the load activity data and the source activity data. DTW is a method of indexing or aligning time series such as the source activity data $A_S$ and the load activity data $A_L$ to maximize their similarity. To perform the alignment, a matrix of size n×n is constructed such that each ($i_{th}$, $j_{th}$) element contains the value of the cost metric $d(a_{L_i}, a_{S_j})$ between the two points $a_{L_i}$ and $a_{S_j}$ (e.g. $d(a_{L_i}, a_{S_j})=\|a_{L_i}-a_{S_j}\|^2$). From this matrix, a warping path W is formed from certain matrix elements (i, j) representing the best alignment of the elements of $A_L$ and $A_S$, subject to constraints in boundary conditions, continuity and monotonicity. The DTW dissimilarity metric between $A_L$ and $A_S$ is defined as the length of minimum cost warping path W, which is $DTW(A_L, A_S)=\gamma(n,n)$, where $\gamma(i,j)=d(a_{L_i}, a_{S_j})+\min(\gamma(i-1, j-1), \gamma(i-1, j), \gamma(i, j-1))$, for the conventional version of the DTW algorithm (i.e. slope constraint parameter P=0).

The equation $DTW(A_L, A_S)=\gamma(n,n)$ may be sensitive to location and scaling differences in $A_L$ and $A_S$, affecting the computation of $d(a_{L_i}, a_{S_j})$. In one embodiment, the matching engine 340 uses a nonparametric normalization to overcome this sensitivity. In this embodiment, each value in $A_L$ and $A_S$ is replaced by its rank in the time series. The result is then normalized to the unit interval to give:

$$a'_{L_i} = \frac{rank_{A_L}(a_{L_i})-1}{|A_L|-1} \text{ and } a'_{S_i} = \frac{rank_{A_S}(a_{S_i})-1}{|A_S|-1}.$$

The automatic matching of loads to sources problem then becomes $\Delta(A_L, A_S)=DTW(A'_L, A'_S)$, where $A'_L=(a'_{L1}, a'_{L2}, \ldots, a'_{Ln})$, $A'_S=(a'_{S1}, a'_{S2}, \ldots, a'_{Sn})$.

In alternative embodiments, the matching engine 340 does not rank or normalize the values of $A_L$ and $A_S$. In other embodiments, the matching engine 340 may rank, normalize, or otherwise adjust the values of $A_L$ and $A_S$ using methods other than those shown.

In other embodiments, programming methods other than DTW (e.g. spectrogram cross-correlation (SPCC), Mel-Frequency Cepstrum Coefficients (MFCC), and so on) may be used to overcome the problem of comparing shifted or stretched time series of the load activity data and the source activity data. In other embodiments, variants of DTW such as fastDTW that approximate the results of DTW by exchanging precision for speed may be used to overcome the problem of comparing shifted or stretched time series of the load activity data and the source activity data.

In one embodiment, the matching engine 340 uses a lower bounding function of DTW to eliminate pairs $(A'_L, A'_S)$ of load activity data and source activity data that could not possibly be the best match. In one embodiment, the matching engine 340 uses the function $$LB\_Keogh(A'_L, A'_S) = \sqrt{\frac{1}{n}\sum_{i=1}^n \begin{cases} (a'_{L_i}-U_i(A'_S))^2 & \text{if } (a'_{L_i}>U_i(A'_S)) \\ (a'_{L_i}-L_i(A'_S))^2 & \text{if } (a'_{L_i}<L_i(A'_S)) \\ 0 & \text{otherwise} \end{cases}},$$

where $U_i(A'_S)=\max_k\{a'_{S_i}:|i-k|\leq r\}$ and $L_i(A'_S)=\min_k\{a'_{S_i}:|i-k|\leq r\}$ for $i=1, \ldots, m$ and a parameter r. The automatic matching of loads to sources problem becomes $\Delta(A_L, A_S)=\max(LB\_Keogh(A'_L, A'_S), LB\_Keogh(A'_S, A'_L))$.

In other embodiments, the matching engine 340 uses known lower bounding functions for indexing time series other than LB_Keogh (e.g. LB_Kim, LB_Yi, and so on) to eliminate pairs of load activity data and source activity data.

With the information regarding which loads connect to which sources the matching engine 340 can construct a topology map indicating the connections between loads and sources.

Figure 4:
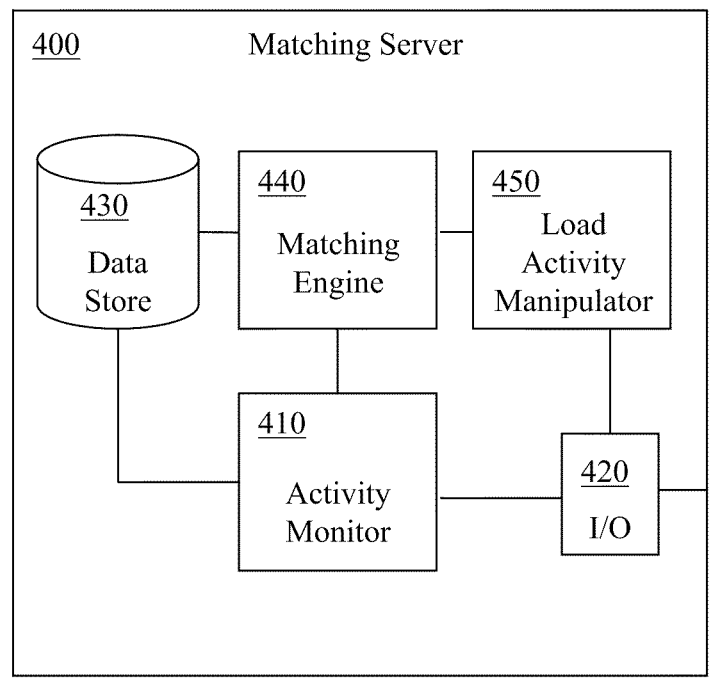
FIG. 4 illustrates a functional block diagram of another embodiment of a matching server for automatically matching loads to sources.

FIG. 4 illustrates a functional block diagram of an embodiment of a matching server 400 for automatically matching loads to sources.

The matching server 400 includes an activity monitor 410 configured to receive the source activity data. In the illustrated embodiment, the activity monitor 410 is operably connected to an I/O interface 420 configured to interact with a network including the loads and sources.

The matching server 400 further includes a data store 430 operably connected to the activity monitor 410 and configured to store the source activity data.

The matching server 400 also includes a matching engine 440 operably connected to the activity monitor 410 or the data store 430 and configured to automatically match sources to loads.

The matching server 400 further includes a load activity manipulator 450. The load activity manipulator 450 is operably connected to the I/O interface 420 which interacts with a network including the loads. The load activity manipulator 450 affects load activity of at least one load at a time. The load activity manipulator 450 affects load activity with a known pattern. Affecting the load activity with a known pattern causes the source activity to be affected accordingly and in a predictable way. The matching engine 440 recognizes the pattern in the source activity data.

In one embodiment, the load activity manipulator 450 affects each load's activity one at a time with a periodic pattern at a known frequency different from frequencies that would normally appear in the load activity. In another embodiment, the load activity manipulator 450 manipulates all loads at the same time. In this embodiment, the load activity manipulator 450 affects each load's activity with a periodic pattern at a known frequency, a different frequency for each load. While the load's activity is being affected with the known frequency pattern, the matching engine 440 observes the source activity data in search of the pattern. In the example of the data center, the load activity manipulator may affect the CPU utilization of a server, for example, by causing the CPU to perform a higher or lesser number of operations that it would otherwise perform.

In one embodiment, the load activity manipulator 450 keeps load activity at a minimum for all loads except at least one load whose load activity is affected with a known pattern. While the load's activity is being affected with the known pattern, the matching engine 440 observes the source activity data in search of the pattern.

In one embodiment, the load activity manipulator 450 affects load activity such that information corresponding to the unique identity of the load in the system is encoded in the source activity data. For example, the load activity manipulator 450 may affect the load activity with a pattern of transitions to convey identification. So, for a load identified as Load 1, the load activity manipulator 450 may affect load activity with one transition over a time period. For a load identified as Load 2, the load activity manipulator 450 may affect load activity with two transitions over the same time period, and so on.

In one embodiment, the load activity manipulator 450 generates the known pattern of transitions to be mutually orthogonal; the maximum number of transitions within the time period equals the total number of loads. In one embodiment, the load activity manipulator 450 uses the Walsh-Hadamard encoding or similar transform to generate the known pattern of transitions. In other embodiments, the load activity manipulator 450 uses other known methods of generating patterns encoding identifying information.

In one embodiment, the matching engine 440 decodes the information in the pattern of transitions from the source activity data. The matching engine 440 then matches the identified load with the source corresponding to the source activity data.

With information regarding which loads connect to which sources at hand, the matching engine 440 can construct a topology map showing the connections between loads and sources.

Figure 5:
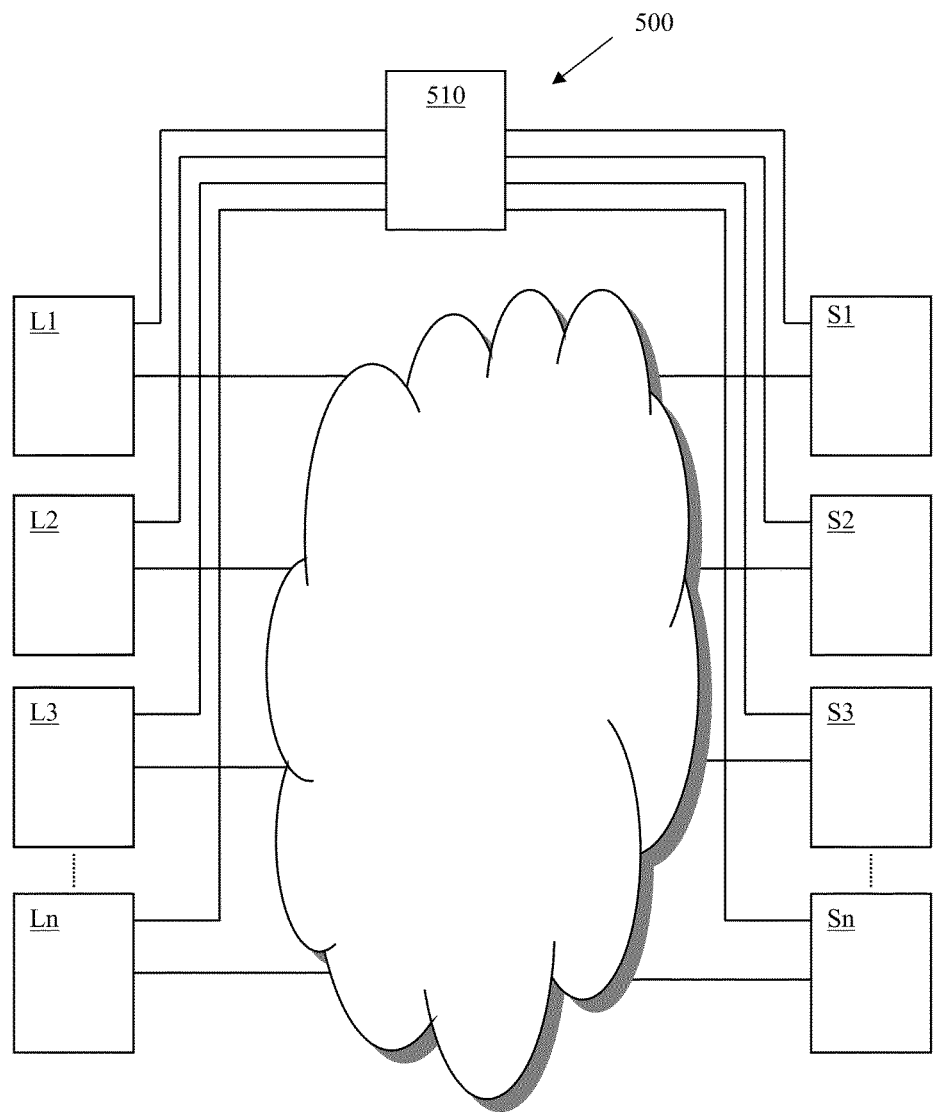
FIG. 5 illustrates a diagram of an exemplary system including loads, sources, and a matching server.

FIG. 5 illustrates a diagram of a system 500 including m loads L1-Lm and m sources S1-Sm. The system 500 includes the same number of loads and sources, m loads and m sources. The connections between the loads and sources are given by a bijective function or one-to-one association where for every load L there is exactly one source S.

In a bijective system such as system 500, the matching server 510 can match loads to sources by at least three approaches.

In one embodiment, the matching server 510 receives load activity data and source activity data. The matching server 510 then computes load-source matching pairs based on the load activity data and the source activity data by calculating scores of similarity or association cost metrics and solving the linear summation assignment problem as described above in reference to FIG. 3.

In a second embodiment, the matching server 510 manipulates the load activity with a known pattern and recognizes the known pattern in the source activity data as described above in reference to FIG. 4. The matching server 510 then matches the load corresponding to the manipulated load activity with the source corresponding to the source activity data containing the pattern.

In a third embodiment, the matching server 510 manipulates the load activity such that the source activity data encodes information corresponding to the identity of the load as described above in reference to FIG. 4. The matching server 510 then decodes the identity information from the source activity data and matches the identified load with the source corresponding to the source activity data.

In other embodiments, the matching server 510 matches loads to sources based on combinations of these three approaches.

Figure 6:
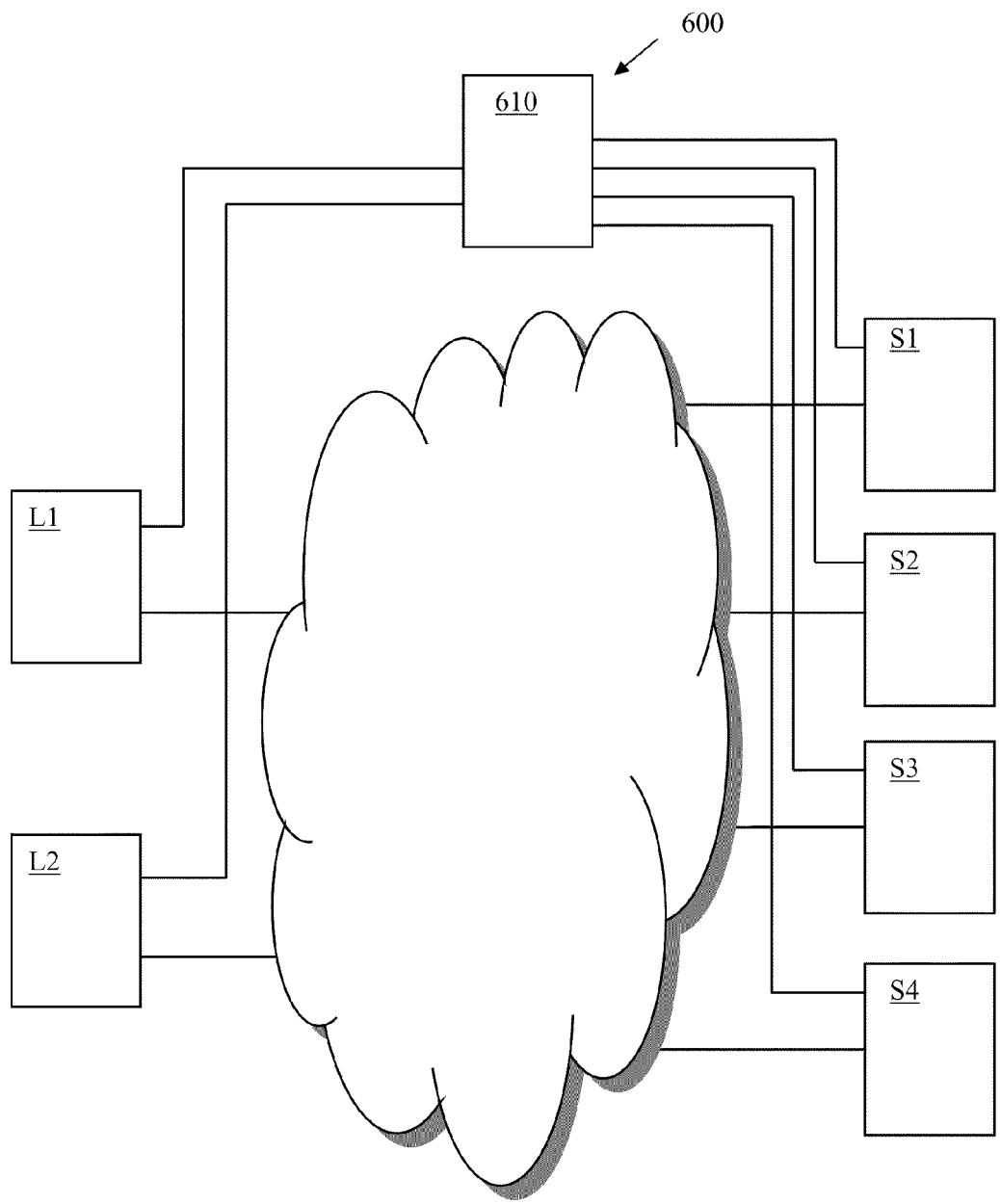
FIG. 6 illustrates a diagram of an exemplary system including loads, sources, and a matching server.

FIG. 6 illustrates a diagram of a system 600 including loads L1 and L2 and sources S1-S4. The system 600 includes redundant sources; two or more sources connect to each load and each source connects to exactly one load. For example, load L1 may connect to sources S1 and S2. The source activity data of both sources S1 and S2 will reflect the load activity corresponding to the load L1. Depending on the type of source activity (e.g. power), the extent to which the source activity data of the source S1 or the source activity data of the source S2 reflect the load activity corresponding to the load L1 may depend on how well the sources S1 and S2 share the load.

In a system such as system 600 having redundant sources, the matching server can match loads to sources by first determining correlation between the sources (i.e. which two or more sources connect to the same load) and treating the correlated sources as a single source.

For example, in system 600 the load L1 may connect to sources S1 and S2. The matching server 610 receives the source activity data corresponding to the sources S1-S4. The matching server 610 determines the connectivity relations between the sources S1-S4 and thus determines that sources S1 and S2 connect to the same load. From that point on, the matching server 610 treats sources S1 and S2 as a single source S1/2. The matching server 610 then matches the source S1/2 to load L1 based on the load activity data corresponding to the load L1 and the source activity data corresponding to source S1, the source activity data corresponding to source S2, or the source activity data corresponding to source S1/2 (i.e. the aggregated source activity data of sources S1 and S2) as described above in reference to FIG. 3.

Figure 7:
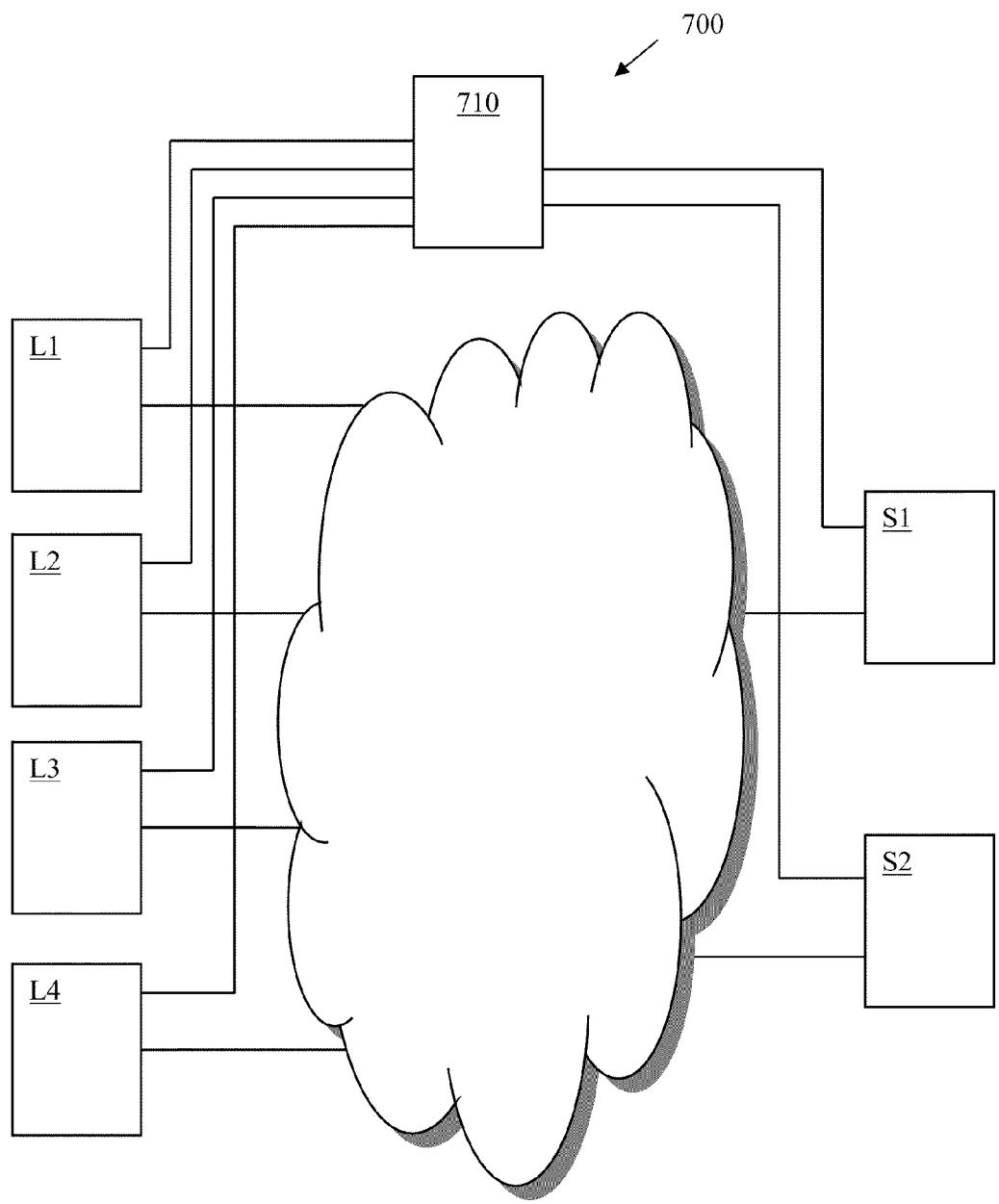
FIG. 7 illustrates a diagram of an exemplary system including loads, sources, and a matching server.

FIG. 7 illustrates a diagram of a system 700 including loads L1-L4 and sources S1 and S2. The system 700 includes common sourced loads; two or more loads connect to each source. For example, load L1 and L2 may connect to source S1. The source activity data corresponding to source S1 will reflect the aggregated load activity corresponding to both loads L1 and L2. Since the multiple loads L1 and L2 operably connect to the one source S1, the load activity of each of the multiple loads L1 and L2 will be reflected in the source activity of the one source S1. However, the load activity reflected in the source activity of the one source S1 would be aggregated load activity corresponding to both loads L1 and L2.

In a system such as system 700 having common sourced loads, the matching server 710 can match loads to sources by at least three approaches.

In a first embodiment, the matching server 710 manipulates the load activity of each load L1-L4 one at a time with a known pattern as described above in reference to FIG. 4. Then, the matching server 710 recognizes the known pattern in the source activity data of the sources S1 and S2. Finally, the matching server 710 matches the loads corresponding to the manipulated load activity with the source corresponding to the source activity data containing the known pattern.

In a second embodiment, the matching server 710 manipulates load activity to keep load activity at a minimum for all loads except one whose load activity it affects with a known pattern as discussed above in reference to FIG. 4. For example, in system 700 the loads L1 and L2 may connect to the source S1. The matching server 710 manipulates the load activity of load L1 to affect it with a known pattern while the matching server 710 manipulates the load activity of loads L2, L3, and L4 to reduce load activity to a minimum. The matching server 710 then observes the source activity data in search of the known pattern to match L1 to S1. The matching server 710 then manipulates the load activity of load L2 to affect it with a known pattern while the matching server 710 manipulates the load activity of loads L1, L3, and L4 to reduce load activity to a minimum. The matching server 710 then observes the source activity data in search of the known pattern to match L2 to S1.

In a third embodiment, the matching server 710 manipulates the load activity such that the source activity data encodes information corresponding to the identity of the load as described above in reference to FIG. 4. For example, in system 700 the loads L1 and L2 may connect to the source S1. The matching server 710 manipulates the load activity corresponding to L1 such that source activity data corresponding to the source S1 encodes information corresponding to the identity of the load L1. The matching server 710 then decodes the identity information from the source activity data corresponding to the source S1 and matches the source S1 with the identified load L1.

In other embodiments, the matching server 710 may match loads to sources based on combinations of these three approaches.

Figure 8:
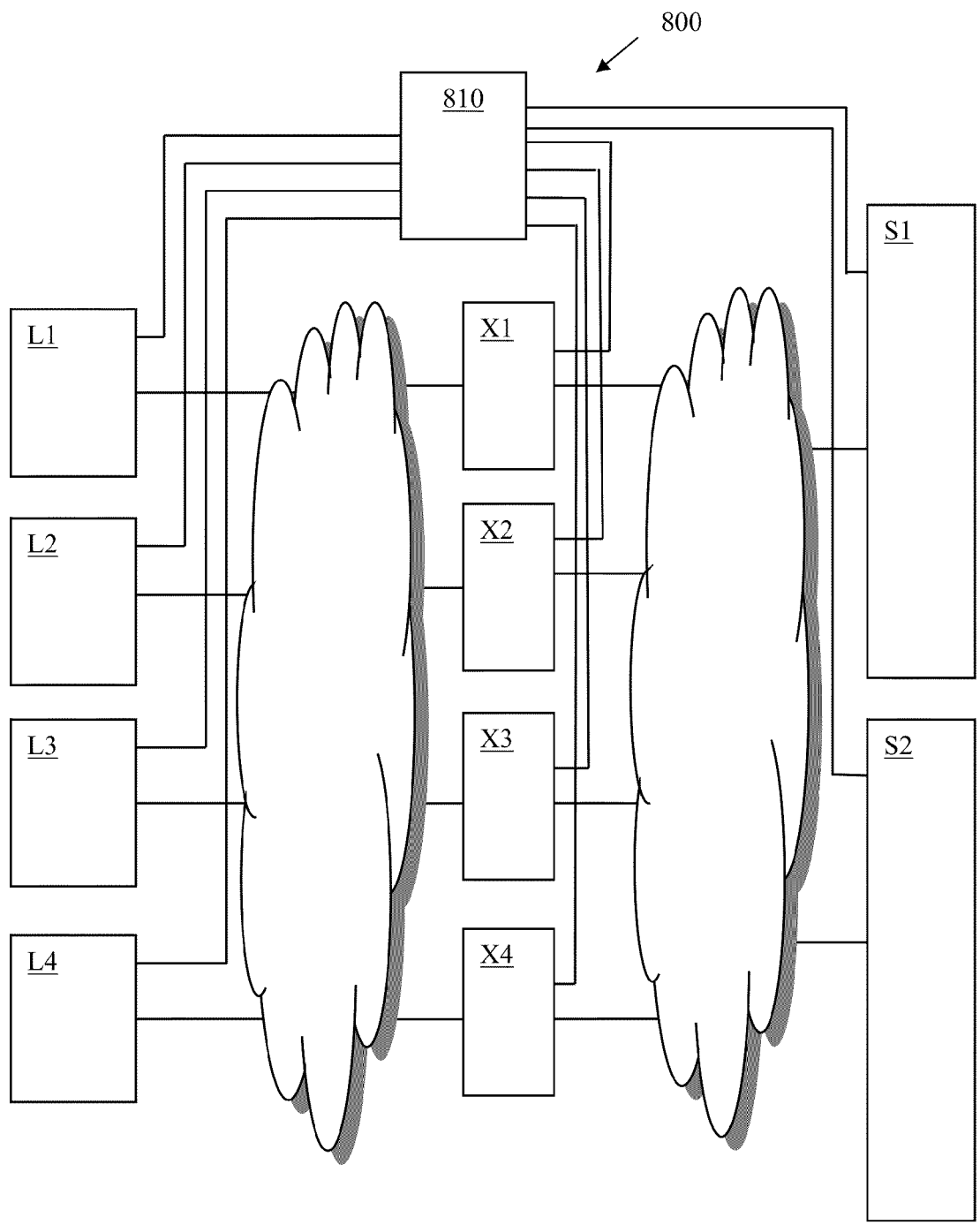
FIG. 8 illustrates a diagram of an exemplary system including loads, sources, and a matching server.

FIG. 8 illustrates a diagram of a system 800 including loads L1-L4. The system 800 also includes sources S1 and S2. Finally, the system 800 includes X1-X4. X1-X4 feed from the sources S1 and S2, thus X1-X4 could be considered loads. However, loads L1-L4 feed from X1-X4 and therefore X1-X4 could also be considered sources. In one example, the sources S1 and S2 are UPS or UPS racks and X1-X4 are PDU. In another example, the sources S1 and S2 are PDU and X1-X4 are power strips or power outlets.

In one embodiment, the loads L1-L4 are common sourced loads (i.e., two or more loads connect to the same source). For example, loads L1 and L2 may operably connect to source S1 and loads L3 and L4 may operably connect to source S2. In this example, the source activity corresponding to source S1 would reflect the aggregated load activity corresponding to both loads L1 and L2 and the source activity corresponding to source S2 would reflect the aggregated load activity corresponding to both loads L3 and L4. The matching server 810 receives load activity data from loads L1-L4 and source activity data from sources S1 and S2. In a system where the loads L1-L4 are common sourced loads, the matching server 810 can match loads L1-L4 to sources S1 and S2 by at least the three approaches discussed above in reference to FIG. 7.

In another embodiment, the system 800 is a bijective system where each load L1-L4 is connected to exactly one of X1-X4 acting as sources. The matching server 810 receives load activity data from the loads L1-L4 and source activity data from X1-X4. The matching server 810 can match loads to sources by at least the three approaches discussed above in reference to FIG. 5.

In yet another embodiment, the system 800 includes redundant sources, meaning that a load operably connects to two or more sources (e.g. load L1 connects to X1 and X2). The matching server 810 receives load activity data from loads L1-L4 and source activity data from X1-X4 acting as sources. The source activity of the redundant sources (e.g. X1 and X2) will both reflect the load activity corresponding to the load (e.g. L1). The matching server 810 can match loads to sources by first determining connectivity relationships between the sources (i.e. which two or more sources are connected to the same load), and then treating the related sources as a single source and matching the single source to a load as described above in reference to FIG. 3.

In other embodiments, the matching server 810 receives load activity data from X1-X4 acting as loads and source activity data from sources S1 and S2. The matching server 810 can match loads X1-X4 to sources S1 and S2 using the various methods discussed above.

Figure 9:
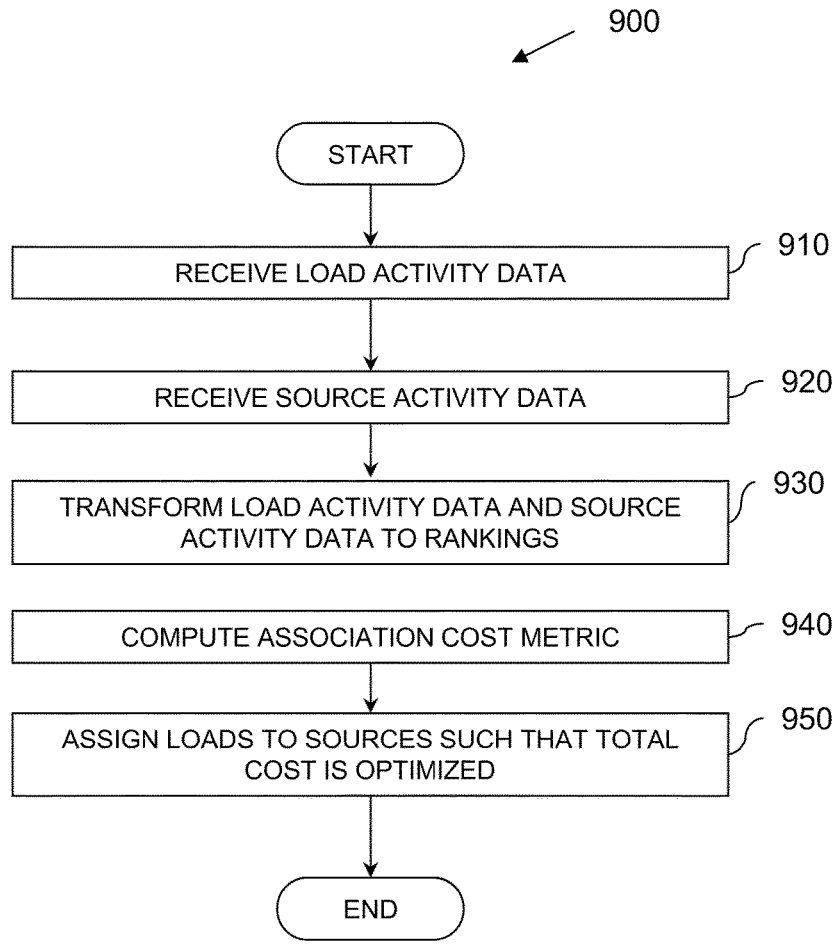
FIG. 9 illustrates an exemplary method of matching sources to loads.
Figure 10:
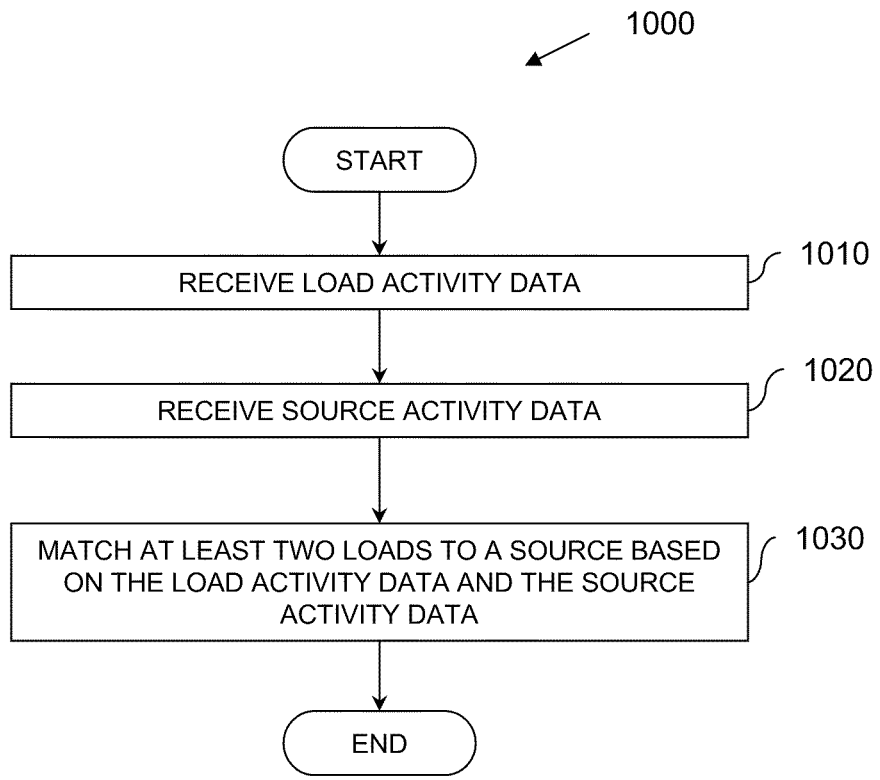
FIG. 10 illustrates an exemplary method of matching sources to loads.
Figure 11:
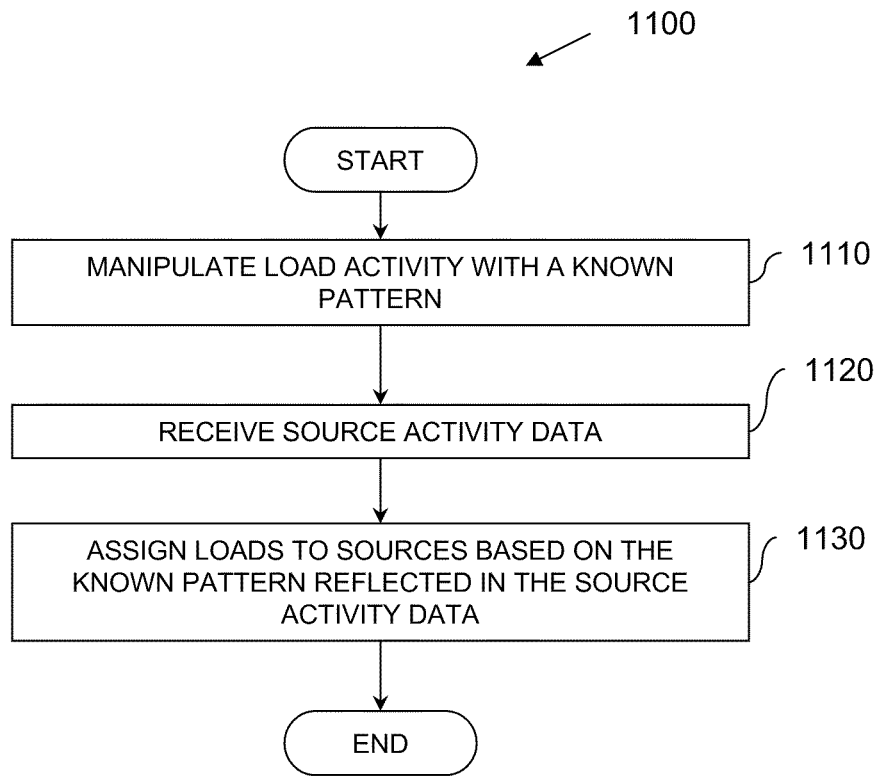
FIG. 11 illustrates an exemplary method of matching sources to loads.

Example methods may be better appreciated with reference to the flow diagrams of FIGS. 9, 10, and 11. While for purposes of simplicity of explanation, the illustrated methodologies are shown and described as a series of blocks, it is to be appreciated that the methodologies are not limited by the order of the blocks, as some blocks can occur in different orders or concurrently with other blocks from that shown or described. Moreover, less than all the illustrated blocks may be required to implement an example methodology. Furthermore, additional or alternative methodologies can employ additional, not illustrated blocks.

In the flow diagrams, blocks denote "processing blocks" that may be implemented with logic. The processing blocks may represent a method step or an apparatus element for performing the method step. A flow diagram does not depict syntax for any particular programming language, methodology, or style (e.g. procedural, object-oriented). Rather, a flow diagram illustrates functional information one skilled in the art may employ to develop logic to perform the illustrated processing. It will be appreciated that in some examples, program elements like temporary variables, routine loops, and so on, are not shown. It will be further appreciated that electronic and software applications may involve dynamic and flexible processes so that the illustrated blocks can be performed in other sequences that are different from those shown or that blocks may be combined or separated into multiple components. It will be appreciated that the processes may be implemented using various programming approaches like machine language, procedural, object oriented, or artificial intelligence techniques.

In one example, methodologies are implemented as processor executable instructions or operations provided on a computer-readable medium. Thus, in one example, a computer-readable medium may store processor executable instructions operable to perform the described methods.

While FIGS. 9, 10, and 11 illustrates various actions occurring in serial, it is to be appreciated that various actions illustrated in FIGS. 9, 10, and 11 could occur substantially in parallel. While a number of processes are described, it is to be appreciated that a greater or lesser number of processes could be employed and that lightweight processes, regular processes, threads, and other approaches could be employed. It is to be appreciated that other example methods may, in some cases, also include actions that occur substantially in parallel.

FIG. 9 illustrates a method 900 of matching sources to loads. At 900, the method 910 receives load activity data corresponding to samples of load activity over a time period. At 920, the method 900 receives source activity data corresponding to samples of source activity over the time period. At 930, the method 900 transforms the load activity data and the source activity data to load activity rankings and source activity rankings, respectively. In one embodiment, the method 900 does not transform the load activity data and the source activity data to load activity rankings and source activity rankings. In one embodiment, the method 900 normalizes the load activity data and the source activity data or the load activity rankings and the source activity rankings. In some embodiments, the method 900 does not normalize the load activity data and the source activity data or the load activity rankings and the source activity rankings.

At 940, the method 900 computes scores of similarity or association cost metrics for each pair of load activity and source activity data samples or rankings. In one embodiment, the score or association cost metric increases as the load activity data and the source activity data are more similar. In another embodiment, the score or association cost metric decreases as the load activity data and the source activity data are more similar. In one embodiment, computing the scores of similarity or association cost metrics includes aligning samples of the load activity data and the source activity data so that similarity is maximized. Where the load activity data and the source activity data have been ranked and normalized, computing the scores or association cost metrics includes aligning the normalized ranks of the load activity data with the normalized ranks of the source activity data. In one embodiment, the aligning is performed using dynamic time warping (DTW) or a lower bounding function of DTW.

At 950, the method 900 assigns or matches loads to sources such that the total cost is optimized. In one embodiment, where the score or association cost metric decreases as the load activity data and the source activity data are more similar, the total cost is optimized when the sum of the association cost metrics or scores is minimized. In one embodiment, assigning or matching loads to sources such that the total cost is optimized involves solving a linear summation assignment problem matrix.

FIG. 10 illustrates a method 1000 of matching sources to loads. At 1010, the method 1000 receives load activity data representing load activity over a time period. At 1020, the method 1000 receives source activity data representing source activity over the time period. The source activity data includes data reflecting aggregated load activity corresponding to multiple loads operably connected to one source. Since the multiple loads operably connect to the one source, the load activity of each of the multiple loads will be reflected in the source activity of the one source. However, the load activity reflected in the source activity of the one source would be aggregated load activity corresponding to all of the multiple loads operably connected to the one source. At 1030, the method 1000 matches at least two loads from the multiple loads to the source based on the load activity data and the source activity data.

FIG. 11 illustrates a method 1100 of matching sources to loads. At 1110, the method 1100 manipulates or affects with a known pattern load activity at a load. In one embodiment, the known pattern corresponds to information uniquely identifying the manipulated load. In another embodiment, the known pattern has a known frequency. At 1120, the method 1100 receives source activity data representing source activity at a plurality of sources. At 1130, the method 1100 matches the load to a source based on the known pattern reflected in the source activity data. The known pattern is recognized in the source activity data corresponding to the source. In the embodiment where the known pattern corresponds to information uniquely identifying the manipulated load, the information uniquely identifying the load is decoded from the source activity data.

Figure 12:
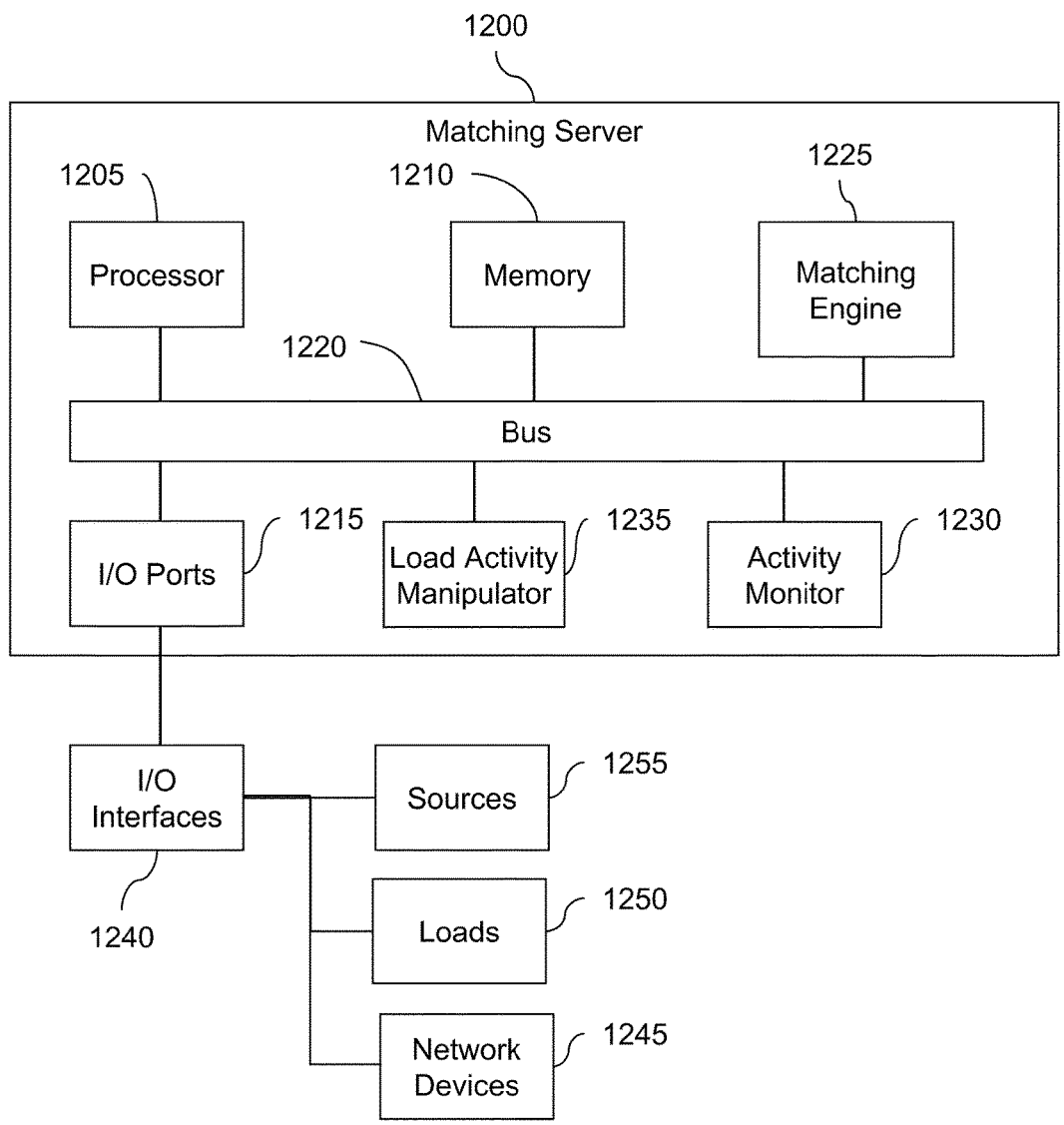
FIG. 12 illustrates a schematic block diagram of one embodiment of a matching server.

FIG. 12 illustrates a block diagram of a matching server 1200 useable in a system for matching loads to sources as disclosed above. The matching server 1200 includes a processor 1205, a memory 1210, and I/O Ports 1215 operably connected by a bus 1220. In one example, the matching server 1200 includes a matching engine 1225 configured to match loads to sources. Thus, the matching engine 1225, whether implemented in matching server 1200 as hardware, firmware, software, or a combination thereof may provide means for matching loads to sources. In one example, the matching server 1200 includes an activity monitor 1230 configured to receive load activity data or source activity data. Thus, the activity monitor 1230, whether implemented in matching server 1200 as hardware, firmware, software, or a combination thereof may provide means for receiving load activity data or source activity data. In one example, the matching server 1200 includes an activity manipulator 1235 configured to manipulate load activity. Thus, the activity manipulator 1235, whether implemented in matching server 1200 as hardware, firmware, software, or a combination thereof may provide means for manipulating load activity.

The processor 1205 can be a variety of various processors including dual microprocessor and other multi-processor architectures. The memory 1210 can include volatile memory or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

The bus 1220 can be a single internal bus interconnect architecture or other bus or mesh architectures. While a single bus is illustrated, it is to be appreciated that matching server 1200 may communicate with various devices, logics, and peripherals using other busses that are not illustrated (e.g., PCIE, SATA, Infiniband, 1394, USB, Ethernet). The bus 1220 can be of a variety of types including, but not limited to, a memory bus or memory controller, a peripheral bus or external bus, a crossbar switch, or a local bus. The local bus can be of varieties including, but not limited to, an industrial standard architecture (ISA) bus, a microchannel architecture (MCA) bus, an extended ISA (EISA) bus, a peripheral component interconnect (PCI) bus, a universal serial (USB) bus, and a small computer systems interface (SCSI) bus.

The matching server 1200 may interact with input/output devices via I/O Interfaces 1240 and I/O Ports 1215. Input/output devices can include, but are not limited to, a keyboard, a microphone, a pointing and selection device, cameras, video cards, displays, network devices 1245, loads 1250, sources 1255, and so on. The I/O Ports 1215 can include but are not limited to, serial ports, parallel ports, and USB ports.

The matching server 1200 can operate in a network environment and thus may be connected to network devices 1245, loads 1250, and sources 1255 via the I/O Interfaces 1240, or the I/O Ports 1215. Through the network devices 1245, the matching server 1200 may interact with a network. Through the network, the matching server 1200 may be logically connected to remote computers. The networks with which the computer 1200 may interact include, but are not limited to, a local area network (LAN), a wide area network (WAN), and other networks. The network devices 1220 can connect to LAN technologies including, but not limited to, Controller Area Network (CAN), fiber distributed data interface (FDDI), copper distributed data interface (CDDI), Broadband Over Power Line (BPL) (IEEE P1901), Ethernet (IEEE 802.3), token ring (IEEE 802.5), wireless computer communication (IEEE 802.11), Bluetooth (IEEE 802.15.1), Zigbee (IEEE 802.15.4) and the like. Similarly, the network devices 1220 can connect to WAN technologies including, but not limited to, point to point links, circuit switching networks like integrated services digital networks (ISDN), packet switching networks, and digital subscriber lines (DSL). While individual network types are described, it is to be appreciated that communications via, over, or through a network may include combinations and mixtures of communications.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or multiple components.

While example systems, methods, and so on, have been illustrated by describing examples, and while the examples have been described in considerable detail, it is not the intention to restrict or in any way limit the scope of the appended claims to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, and illustrative examples shown or described. Thus, this application is intended to embrace alterations, modifications, and variations that fall within the scope of the appended claims. Moreover, the foregoing embodiments are illustrative, and no single feature or element is essential to all possible combinations that may be claimed. Furthermore, the preceding description is not meant to limit the scope of the invention. Rather, the scope of the invention is to be determined by the appended claims and their equivalents.

What is claimed is:

1. A computer implemented method for determining a connectivity relationship between a source and a load on a network, the method comprising:
    manipulating a load activity of at least one load of a plurality of loads on a network over a time period;
    receiving, for each of the plurality of loads, load activity data characterizing the load activity of each respective load over the time period;
    receiving source activity data associated with at least one source on the network characterizing a source activity of the source over the time period;
    calculating a plurality of scores, wherein each score is indicative of a similarity between the load activity data of a given load of the plurality of loads and the source activity data of the at least one source; and
    identifying a given score of the plurality scores corresponding to an optimal score, wherein the optimal score is indicative of a connectivity relationship between the at least one load and the at least one source on the network.

2. The computer-implemented method of claim 1, wherein the load activity of the at least one load corresponds to at least one of power consumption, signal strength, heat dissipation, torque, pressure, flow, operations per unit time, CPU utilization, I/O utilization, and network utilization.

3. The computer-implemented method of claim 1, wherein the source activity of the at least one source corresponds to at least one of power consumption, current, harmonic distortion, power factor, real power, apparent power, pressure, and flow.

4. A computer implemented method for determining a connectivity relationship between a source and a load on a network, the method comprising:
    affecting a load activity of at least one load of a plurality of loads on a network with a known pattern;
    receiving source activity data characterizing a source activity of at least one source of a plurality of sources on the network, wherein the source activity data comprises data indicative of the known pattern; and
    evaluating load activity data of each of the plurality of loads relative to the source activity data of the at least one source to identify the known pattern to determine a connectivity relationship between the at least one load and the at least one source on the network.

5. The computer-implemented method of claim 4, further comprising receiving the load activity data representing the load activity of each of the plurality of loads.

6. The computer-implemented method of claim 4, wherein the source activity data is indicative of aggregated load activity corresponding to load activity at the plurality of loads on the network.

7. A computer-implemented method for determining a connectivity relationship between a load and a source on a network comprising:
   applying a known pattern to at least one load of a plurality of loads on a network to affect a load activity of the at least one load, the known pattern corresponding to information identifying the at least one load of the plurality of loads on the network;
   receiving at least one of load activity data characterizing the load activity for each of the plurality of loads and source activity data characterizing a source activity of at least one source on the network; and
   evaluating the source activity data to identify the known pattern applied to the at least one load of the plurality of loads to determine a connectivity relationship between the at least one source at the least one load on the network.

8. The computer-implemented method of claim 7, wherein the source activity data includes data indicative of aggregated load activity corresponding to the plurality of loads connected to the at least one source on the network.

9. The computer-implemented method of claim 7, wherein the source activity corresponds to at least one of power consumption, current, harmonic distortion, power factor, real power, apparent power, pressure, and flow.

10. The computer-implemented method of claim 7, wherein to evaluate the source activity data comprises decoding the information identifying the at least one load and associating the at least one source with the at least one load based on the decoded information, wherein the association is indicative of the connectivity relationship between the at least one source and the at least one load.

11. The computer-implemented method of claim 1, wherein the manipulating of the load activity of the at least one load of the plurality of loads is based on a condition associated with a given one of the plurality of loads.

12. The computer-implemented method of claim 1, wherein the at least one source corresponds to a plurality of sources;
   wherein the source activity data includes aggregated source activity data indicative of the manipulation of the load activity data of the at least one load at the plurality sources; and
   wherein the optimal score is indicative of a connectivity relationship between at least two sources of the plurality of sources and the at least one load of the plurality loads.

13. The computer-implemented method of claim 1,
   wherein the source activity data includes data indicative of the manipulation of the load activity data of at least two loads; and
   wherein the optimal score is indicative of a connectivity relationship between the at least two loads of the plurality of loads and the at least one source.

14. The computer-implemented method of claim 1, further comprising:
   generating connectivity relationship data characterizing the determined connectivity relationship between the at least one load and the at least one source on the network; and
   generating a connection map representing the connectivity relationship between the at least one load and the at least one source on the network based on the connectivity relationship data.

* * * * *